US011775179B2

(12) United States Patent
Li et al.

(10) Patent No.: US 11,775,179 B2
(45) Date of Patent: Oct. 3, 2023

(54) ENABLING STRIPE-BASED OPERATIONS FOR ERROR RECOVERY AT A MEMORY SUB-SYSTEM

(71) Applicant: MICRON TECHNOLOGY, INC., Boise, ID (US)

(72) Inventors: Juane Li, Milpitas, CA (US); Fangfang Zhu, San Jose, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 9 days.

(21) Appl. No.: 17/459,927

(22) Filed: Aug. 27, 2021

(65) Prior Publication Data

US 2023/0061994 A1  Mar. 2, 2023

(51) Int. Cl.
*G06F 3/06* (2006.01)
*G06F 11/14* (2006.01)

(52) U.S. Cl.
CPC .......... *G06F 3/0619* (2013.01); *G06F 3/0631* (2013.01); *G06F 3/0656* (2013.01); *G06F 3/0659* (2013.01); *G06F 3/0673* (2013.01); *G06F 11/1435* (2013.01)

(58) Field of Classification Search
CPC .... G06F 3/0619; G06F 3/0631; G06F 3/0656; G06F 3/0659; G06F 3/0673; G06F 11/1435
USPC .......................................................... 714/15
See application file for complete search history.

(56) References Cited

U.S. PATENT DOCUMENTS

2006/0053287 A1* 3/2006 Kitamura ............ G06F 11/1076
714/E11.034
2021/0241283 A1* 8/2021 Kumawat .......... G06Q 20/4093

OTHER PUBLICATIONS

Wikipedia "RAID" page, from date Aug. 12, 2021, retrieved from https://web.archive.org/web/20210812134456/https://en.wikipedia.org/wiki/RAID (Year: 2021).*

* cited by examiner

*Primary Examiner* — Yair Leibovich
(74) *Attorney, Agent, or Firm* — Lowenstein Sandler LLP

(57) ABSTRACT

A request to program a set of host data items to management units (MUs) of a fault tolerant stripe associated with a memory sub-system is received. A set of memory access operations to be executed at the MUs of the fault tolerant stripe in accordance with the received request is determined. The set of memory access operations include one or more read operations to read data from the MUs of the fault tolerant stripe. The set of memory access operations also include one or more write operations to write the set of host data items and redundancy metadata associated with the set of host data items to MUs of the fault tolerant stripe. A first series of commands corresponding to the one or more read operations of the set of memory access operations is executed. The redundancy metadata associated with the set of host data items is generated based on the data read from the MUs of the fault tolerant stripe during execution of the first series of commands and the set of host data items. A second series of commands corresponding to the one or more write operations of the set of memory access operations is executed.

20 Claims, 7 Drawing Sheets

ENABLING STRIPE-BASED OPERATIONS FOR ERROR RECOVERY AT A MEMORY SUB-SYSTEM

TECHNICAL FIELD

Embodiments of the disclosure relate generally to memory sub-systems, and more specifically, relate to enabling stripe-based operations for error recovery at a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
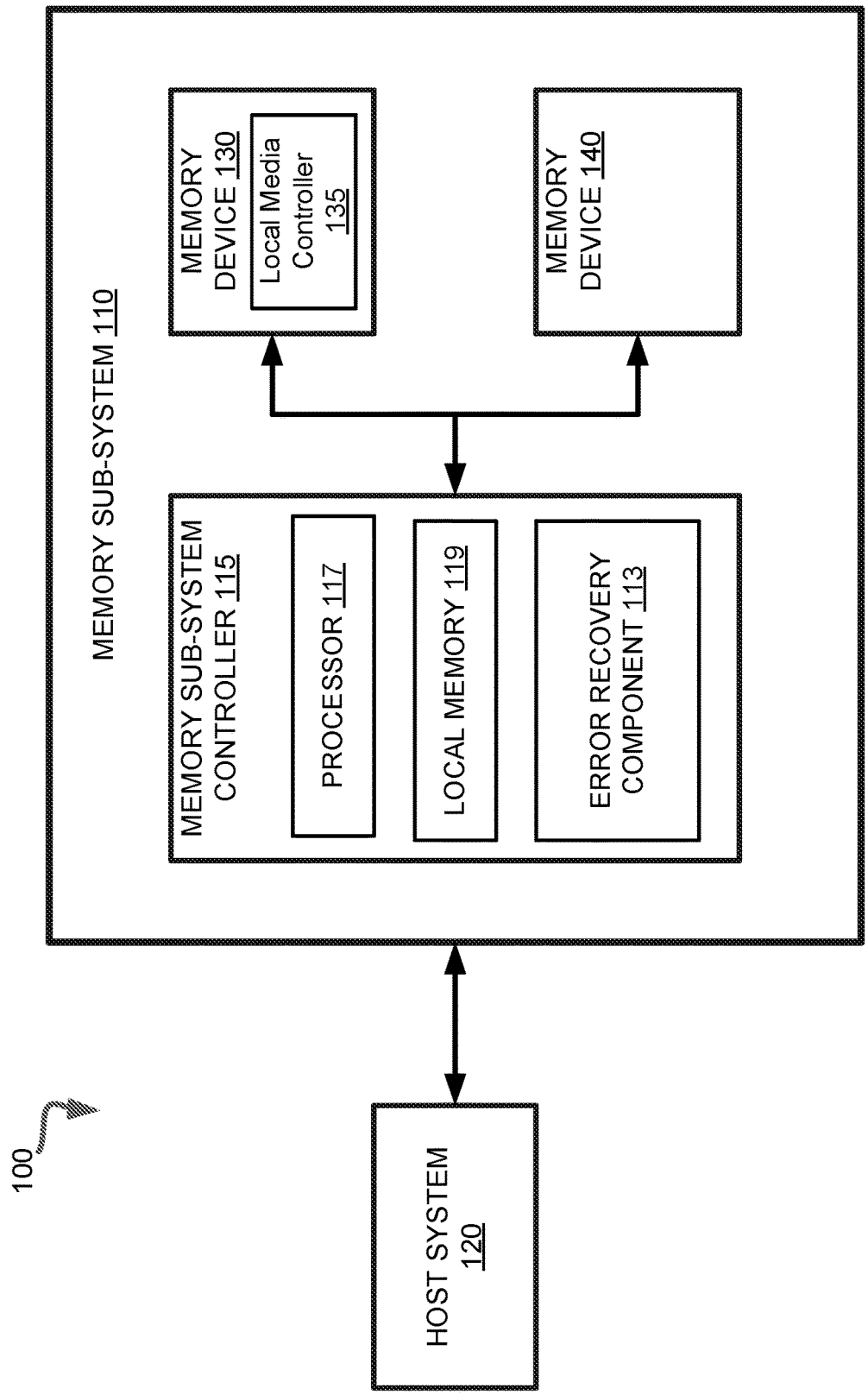
FIG. 1 illustrates an example computing system that includes a memory sub-system, in accordance with some embodiments of the present disclosure.

Aspects of the present disclosure are directed to enabling stripe-based operations for error recovery at a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page includes a set of memory cells. A memory cell is an electronic circuit that stores information. Some types of memory, such as 3D cross-point, can group pages across dice and channels to form management units (MUs) (also referred to as logical units (LUNs)). A MU can correspond to a page, a block, etc. In some instances, a group of MUs that are grouped together for management purposes can be referred to as a super MU (SMU).

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell may be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data.

As described above, a die can contain one or more planes. A memory sub-system can use a striping scheme to treat various sets of data as units when performing data operations (e.g., write, read, erase, etc.). A die stripe refers to a collection of planes that are treated as one unit when writing, reading, or erasing data. A controller of a memory device (i.e., a memory sub-system controller, a memory device controller, etc.) can execute the same operation can carry out the same operation, in parallel, at each plane of a dice stripe. A block stripe is a collection of blocks, at least one from each plane of a die stripe, that are treated as a unit. The blocks in a block stripe can be associated with the same block identifier (e.g., block number) at each respective plane. A page stripe is a set of pages having the same page identifier (e.g., the same page number), across a block stripe, and treated as a unit. A MU stripe is a collection of MUs, at least one from each plane of a die stripe, a block stripe, a page stripe, etc., that are treated as a unit. A super management unit (SMU) refers to a collection or group of MUs that are grouped together for memory management purposes.

A host system can initiate a memory access operation (e.g., a programming operation, a read operation, an erase operation, etc.) on a memory sub-system. For example, the host system can transmit a request to a memory sub-system controller, to program data to and/or read data from a memory device of the memory sub-system. Such data is referred to herein as "host data." The memory sub-system controller can execute one or more operations to access the host data in accordance with request. As data is accessed at a memory cell of a memory device, the memory cell can deteriorate and eventually become defective. For example, when a host system initiates too many memory access operations for host data stored at a memory device, the memory cells that store the host data, as well as the adjacent memory cells at the memory device, can become corrupted.

A memory sub-system can support a redundancy mechanism to protect host data against a memory access failure. For example, the memory sub-system can implement one or more redundancy operations (e.g., redundant array of independent NAND (RAIN) operations) to provide redundancy for the data stored on the memory sub-system. When host data is received from the host system to be programmed to a memory device of the memory sub-system, a memory sub-system controller can generate redundancy metadata (e.g., parity data) based on an exclusive-or (XOR) operation with the received host data and can use the redundancy metadata to reconstruct or recalculate the host data in the event of a failure of a portion of the memory device that is storing host data. As an example, the memory sub-system controller can generate the redundancy metadata based on an XOR operation applied to host data stored at a particular number of data locations of a management unit (e.g., a page, a block) of the memory sub-system. If a portion of a memory device storing the host data fails and the corresponding data is lost or corrupted, the memory sub-system controller can reconstruct the lost/corrupted data based on an XOR operation among the rest of the host data and the redundancy metadata.

Some memory sub-systems can include multiple fault tolerant stripes across multiple memory devices of a memory sub-system. A fault tolerant stripe refers to a collection of management units (MUs) (e.g., blocks, pages, etc.) at particular regions (e.g., planes) of two or more memory devices. A memory sub-system controller can maintain redundancy metadata for each data item (e.g., a host data item) programmed to a MU of the fault tolerant stripe. In order to maintain the ability to reconstruct lost or corrupted host data, the memory sub-system controller can update the redundancy metadata responsive to programming each host data item to a MU of the fault tolerant stripe. In some instances, the memory sub-system controller can perform a read-modify-write operation to generate the redundancy metadata for the fault tolerant stripe. A read-modify-write operation is a stripe-based operation that is performed for each data item programmed to a MU of the fault tolerant stripe. For example, during execution of the read-modify-write operation, the memory sub-system controller can read data that is programmed to MUs of the fault tolerant stripe (i.e., the read portion of the read-modify-write operation). The read data can include host data and/or redundancy metadata generated for the host data. Once the data is read from the MUs of the fault tolerant stripe, the memory sub-system can modify the data and program the modified data to the MUs of the fault tolerant stripe. With respect to redundancy metadata for a fault tolerant stripe, the memory sub-system controller can modify the read redundancy metadata by generating updated redundancy metadata (e.g., based on the host data read from the MUs during the read portion of the read-modify-write operation and host data to be programmed to the fault tolerant stripe) and can program the updated redundancy metadata to the MUs of the fault tolerant stripe.

As indicated above, a read-modify-write operation is a stripe-based operation that involves accessing one or more MUs of a fault tolerant stripe. Some memory sub-systems are not configured to support stripe-based operations, and therefore cannot execute a read-modify-write operation to maintain redundancy metadata for a fault tolerant stripe. Some memory sub-systems that cannot support stripe-based operations do not generate or update redundancy metadata for a fault tolerant stripe until host data is programmed to each host data MU of the fault tolerant stripe (i.e., the fault tolerant stripe is "closed). However, catastrophic memory failure can occur as the memory sub-system controller is waiting for host data to be programmed to each available MU of the fault tolerant stripe. If redundancy metadata is not generated and/or updated for the host data that is programmed to the fault tolerant stripe before the catastrophic failure, the host data can be unrecoverable. Some memory sub-systems that cannot support stripe-based operations can implement other techniques to generate and/or update redundancy metadata for host data before the fault tolerant stripe is closed. For instance, some memory sub-systems can generate redundancy metadata for host data as the host data is programmed to the fault tolerant stripe and can store the redundancy metadata at a redundancy metadata data structure until the fault tolerant stripe is closed and the memory sub-system controller can store generated redundancy metadata for all of the host data programmed to the fault tolerant stripe at another portion of the memory sub-system (e.g., at a particular memory device, at a memory cache, etc.). However, tracking and storing the redundancy metadata for host data at multiple fault tolerant stripes before the stripes are closed can consume a significant number of computing resources (e.g., storage space, processing cycles, etc.). The resources that are consumed by these processes are therefore not available to other processes, which can increase an overall system latency and decrease an overall system efficiency.

Aspects of the present disclosure address the above and other deficiencies by enabling stripe-based operations for error recovery at a memory sub-system. In some embodiments, a memory sub-system controller can receive a request to program a set of host data items to management units (MUs) of a fault tolerant stripe associated with the memory sub-system. The request can correspond to a stripe-based read-modify-write command to read existing host data programmed to the fault tolerant stripe, as well as redundancy metadata for the existing host data, from the fault tolerant stripe, update the redundancy metadata based on the host data items of the request and the existing host data, and program the updated redundancy metadata to the fault tolerant stripe.

Responsive to receiving the request, the memory sub-system controller can determine a set of memory access operations to be executed at the MUs of the fault tolerant stripe in accordance with the request. The set of memory access operations can include one or more read operations to read the existing host data and redundancy metadata from the fault tolerant stripe (i.e., in accordance with the read portion of the read-modify-write command). The set of memory access operations can also include one or more write operations to write each of the set of host data items and the updated redundancy metadata to the fault tolerant stripe (i.e., in accordance with the write portion of the read-modify-write command). The memory sub-system controller can execute a first series of commands that correspond to the one or more read operations of the set of memory access operations.

The memory sub-system controller can obtain, as a result of performing the one or more read operations of the first series of commands, data that corresponds to the existing host data that is programmed to the fault tolerant stripe, as well as redundancy metadata associated with the existing host data. The memory sub-system controller can generate redundancy metadata associated with the set of host data items based on each of the set of host data items and the obtained data. For example, the memory sub-system controller can execute an XOR operation based on each of the set of host data items and the existing host data to generate the updated redundancy metadata. In another example, the memory sub-system controller can execute an XOR operation based on each of the set of host data items and redundancy metadata for the existing host data to generate the updated redundancy metadata. Responsive to generating the updated redundancy metadata, the memory sub-system controller can execute a second series of commands that correspond to the one or more write operations of the set of memory access operations. By executing the second series of commands, the memory sub-system controller can write each of the set of host data items and the updated redundancy metadata to one or more respective MUs of the fault tolerant stripe.

Advantages of the present disclosure include, but are not limited to, providing a scheme enables stipe-based operation for error recovery flow. As indicated above, embodiments of the present disclosure enable stripe-based operations by determining a set of memory access operations (e.g., read operations, write operations, etc.) associated with a stripe-based command (e.g., a read-modify-write operation) and executing one or more series of commands based on the determined set of memory access operations. Accordingly, memory sub-systems (e.g., memory sub-systems that are not configured to support stripe-based operations) can support read-modify-write operations to update redundancy metadata for a fault tolerant stripe as host data is programmed to MUs of the fault tolerant stripe. As redundancy metadata is generated for host data as the host data is programmed to the fault tolerant stripe, the host data can be protected in the event of catastrophic memory failure before the fault tolerant stripe is closed. In addition, the memory sub-system controller does not track and store generated redundancy metadata for host data at another portion of memory at the memory sub-system. Accordingly, additional system resources can be made available to other processes associated with the memory sub-system, which can decrease an overall system latency and decrease an overall system efficiency.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes an error recovery component 113 (referred to as error recovery component 113) that can manage redundancy data generated for host data stored at one or more portions of a memory device 130, 140. In some embodiments, the memory sub-system controller 115 includes at least a portion of the error recovery component 113. For example, the memory sub-system controller 115 can include a processor 117 (processing device) configured to execute instructions stored in local memory 119 for performing the operations described herein. In some embodiments, the error recovery component 113 is part of the host system 120, an application, or an operating system.

Error recovery component 113 can be configured to enable stripe-based operations for error recovery at memory sub-system 110. In some embodiments, memory sub-system controller 115 can receive a request to program a set of host data items to one or more management units (MUs) of a fault tolerant stripe. A host data item refers to a unit of host data that is programmable to one or more MUs of a fault tolerant stipe. Host data refers to one or more host data items. Memory sub-system controller 115 can receive the request from host system 120, in some embodiments. In some implementations, error recovery component 113 (or another component of memory sub-system controller 115) can identify one or more additional host data items that are to be stored to the fault tolerant stripe (e.g., at a memory cache associated with memory sub-system 110). Error recovery component 113 can include the identified one or more additional host data items in the set of host data items that are to be programmed to the fault tolerant stripe.

As indicated above, in some embodiments, the request to program the set of host data items can correspond to a read-modify-write operation (i.e., a stripe-based operation). Error recovery component 113 can determine a set of memory access operations that are to be executed at MUs of the fault tolerant stripe in accordance with the read-modify-write operation. The set of memory access operations can include one or more read operations to read existing host data and redundancy metadata (e.g., parity data) for the existing host data from one or more MUs of the fault tolerant stripe. The set of memory access operations can also include one or more write operations to write each of the set of host data items and redundancy metadata associated with the set of host data items to respective MUs of the fault tolerant stripe. Error recovery component 113 can generate and execute a first series of commands corresponding to the one or more read operations of the set of memory access operations. In some embodiments, error recovery component 113 can obtain the existing host data and/or the redundancy metadata for the existing host data, responsive to the execution of the first series of commands. Error recovery component 113 can generate updated redundancy metadata based on each of the set of host data items, the obtained existing host data, and/or the redundancy metadata for the existing host data, in accordance with embodiments described herein. Responsive to generating the updated redundancy metadata, error recovery component 113 can execute a second series of commands corresponding to the one or more write operations of the set of memory access operations. The second series of commands can cause the memory sub-system controller 115 to program each of the set of host data items and the updated redundancy metadata to respective MUs of the fault tolerant stripe. Further details regarding the error recovery component 113 are provided herein.

Figure 2:
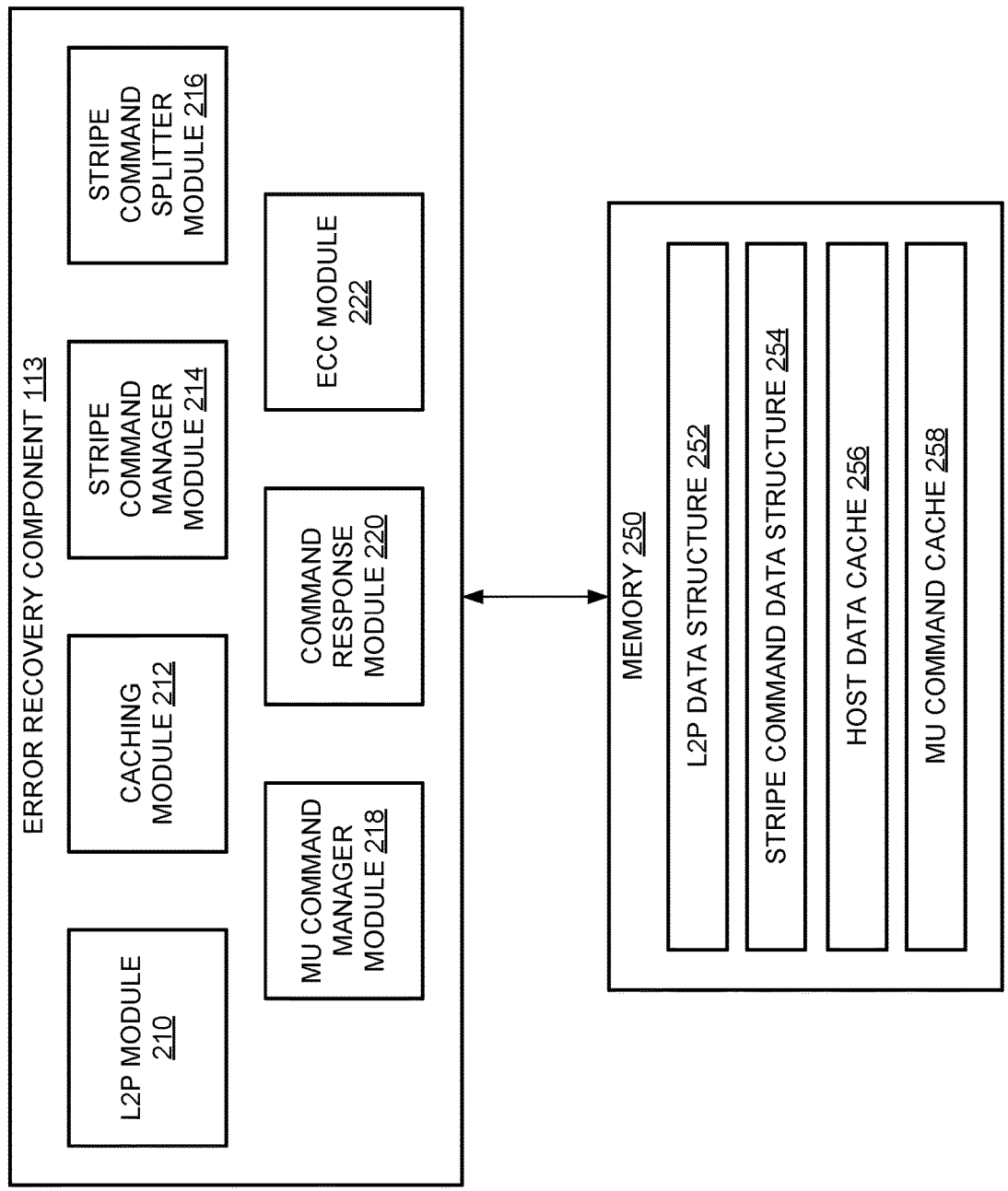
FIG. 2 is a block diagram for an error recovery component 113, in accordance with some embodiments of the present disclosure.

FIG. 2 is a block diagram for an error recovery component 113, in accordance with some embodiments of the present disclosure. In some embodiments, error recovery component 113 can include a logical-to-physical (L2P) module 210, a caching module 212 a stripe command manager module 214 (referred to as stripe command manager 214 herein), a stripe command splitter module 216 (referred to as a stripe command splitter 216 herein), a MU command manager module 218 (referred to as a MU command manager 218 herein), a command response module 220, and an ECC module 222. In some embodiments, error recovery component 113 can be connected to a memory 250. Memory 250 can correspond to one or more portions of memory at memory sub-system 110. In some embodiments, memory 250 can correspond to one or more portions of local memory 119 and/or one or more portions of a memory device 130, 140, as described with respect to FIG. 1.

As indicated above, memory sub-system controller 115 can receive a request (e.g., from host system 120) to program one or more host data items to a memory device 130, 140 of memory sub-system 110. In some embodiments, the request can include an indication of a logical address associated with the one or more host data items. The logical address can include an indication of a virtual super MU (vSMU), a virtual fault tolerant stripe of the vSMU, and/or a virtual MU (vMU) of the virtual fault tolerant stripe that is associated with the one or more host data items. In some embodiments, L2P module 210 can translate the indication of the vSMU, the virtual fault tolerant stripe, and/or the vMU to an indication of a physical super MU (SMU), a physical fault tolerant stripe of the SMU, and/or a physical MU of the fault tolerant stripe, respectively. L2P module 210 can determine a physical address associated with one or more MUs of memory devices 130, 140 that is to store the one or more host data items. In some embodiments, L2P module can translate the indication of the vSMU, the virtual fault tolerant stripe, and/or the vMU by identifying a mapping that corresponds to the vSMU, the virtual fault tolerant stripe, and/or the vMU at a L2P data structure 252 (e.g., a L2P table). In other or similar embodiments, L2P module can translate the indication of the vSMU, the virtual fault tolerant stripe, and/or the vMU by providing the indication of the vSMU, the virtual fault tolerant stripe, and/or the vMU as input to one of more functions.

Memory 250 can include a cache that is configured to temporarily store host data items before they are programmed to MUs of memory devices 130, 140 (referred to as host data cache 256 herein). In some embodiments, caching module 212 can temporarily store host data items at host data cache 256 until memory sub-system 110 receives enough host data from host system 120 to fill each MU of a fault tolerant stripe. In an illustrative example, a fault tolerant stripe can include 16 MUs. Of the 16 MUs, 15 MUs can be allocated to store host data (referred to as host data MUs herein) and 1 MU can be allocated to store redundancy metadata for the host data (referred to as a redundancy metadata MU herein). In some embodiments, in response to receiving a request to program a host data item to memory sub-system 110, caching module 212 can temporarily store the host data item at a portion of host data cache 256 that corresponds to the fault tolerant stripe. Responsive to storing the host data item to the corresponding portion of host data cache 256, caching module 212 can determine whether the corresponding portion holds enough host data that can be programmed to 15 host data MUs of the fault tolerant stripe. In response to determining that enough host data is temporarily stored at the corresponding portion, caching module 212 can transmit a notification to stripe command manager 214 indicating that 15 MUs worth of host data is stored at the corresponding portion of host data cache 256. Stripe command manager 214 can generate a command (referred to as a full stripe programming command or a full stripe programming operation herein) to program the host data items at the corresponding portion of host data cache 256, and redundancy metadata associated with each of the host data items, to the fault tolerant stripe, in accordance with embodiments provided herein.

In another illustrative example, responsive to receiving a request to program a host data item to memory sub-system 110, caching module 212 can temporarily store the host data item to a portion of host data cache 256 that corresponds to a respective fault tolerant stripe, as described above. Caching module 212 can determine that host data stored at the corresponding portion of host data cache 256 is to be programmed to respective MUs of the fault tolerant stripe even though the corresponding portion of host data cache 256 does not include enough host data to fill the 15 host data MUs of the fault tolerant stripe. For example, caching module 212 can determine that a number of host data items stored at host data cache 256 meets or exceeds a threshold number of data items (e.g., is almost full) and one or more host data items are to be removed from host data cache 256 to make room for additional incoming host data items. In another example, caching module 212 can determine that host data stored at the corresponding portion of host data cache 256 is to be programmed to the respective fault tolerant stripe in accordance with a programming protocol associated with the memory sub-system 110. Responsive to determining that the host data stored at the corresponding portion of host data cache 256 is to be programmed to the fault tolerant stripe, caching module 212 can transmit an instruction to stripe command manager 214 to initiate one or more programming operations to program the host data items at the corresponding portion to the fault tolerant stripe. Stripe command manager 214 can generate a command (referred to herein as a partial stripe programming command or a partial stripe programming operation herein) to program the host data items to a portion of the host data MUs of the fault tolerant stripe in accordance with embodiments provided herein.

As indicated above, stripe command manager 214 can generate one or more commands to program host data items that are temporarily stored at host data cache 256 to respective MUs of a fault tolerant stripe. In some embodiments, the one or more commands can correspond to a full stripe programming operation, as described above. In such embodiments, the one or more commands can include at least a first command to generate redundancy metadata based on each of the host data items that are temporarily stored at host data cache 256 and a second command to program each of the host data items and the generated redundancy metadata to respective MUs (e.g., the 15 host data MUs and the 1 redundancy metadata MU) of the fault tolerant stripe. As the one or more commands corresponding to the full stripe programming operation do not include any commands to read host data from the fault tolerant stripe and generate updated redundancy metadata using the read host data, the one or more commands may not correspond to a read-modify-write operation. Accordingly, stripe command manager 214 can transmit the one or more commands associated with the full stripe programming operation to be executed by MU command manager 218, in some embodiments. In other or similar embodiments, stripe command manager 214 can transmit the one or more commands associated with the full stripe programming operation to stripe command splitter module 216.

In other or similar embodiments, the one or more commands generated by stripe command manager 214 can correspond to a partial stripe programming operation, as indicated above. In such embodiments, the one or more commands can correspond to a read-modify-write operation to read data (e.g., existing host data and redundancy metadata for host data) from the MUs of the fault tolerant stripe, update redundancy metadata read from the MUs in view of the one or more host data items at the host data cache 256, and write each of the one or more host data items at host data cache 256 and the updated redundancy metadata to respective MUs of the fault tolerant stripe. As the one or more commands generated by stripe command manager 214 can correspond to a read-modify-write operation, stripe command manager 214 can transmit the one or more generated commands to stripe command splitter 216.

Stripe command splitter 216 can be configured to determine a set of memory access operations to be performed in accordance with a command generated by stripe command manager module 214 (i.e., a full stripe programming command, a partial stripe programming command, etc.). In some embodiments, stripe command splitter 216 can analyze (e.g., parse through) a given command generated by stripe command manager 214 and can identify one or more types of memory access operations that are invoked during execution of the given command. For example, one or more operations for a full stripe programming command can correspond to writing host data items to each of the 15 host data MUs of the fault tolerant stripe and writing redundancy metadata for each of the 15 host data MUs to a redundancy metadata MU of the fault tolerant stripe. Accordingly, stripe command splitter 216 can determine that 16 write operations are invoked during execution of the full stripe programming operation.

In another illustrative example, host data can already be programmed to 3 host data MUs of a fault tolerant stripe and redundancy metadata associated with the 3 data items can be programmed to a redundancy metadata MU of the fault tolerant stripe. Accordingly, 12 host data MUs of the fault tolerant stripe can be available to store incoming host data items (i.e., the fault tolerant stripe is "open"). The partial stripe programming operation provided by stripe command manager 214 can correspond to 5 host data items that are temporarily stored at host data cache 256, as described above. Accordingly, one or more operations of the partial stripe command can correspond to reading the existing host data from the 3 host data MUs and the redundancy metadata MU of the fault tolerant stripe. The one or more operations can also correspond to writing each of the 5 host data items that are temporarily stored at the host data cache 256 to available host data MUs of the fault tolerant stripe and writing updated redundancy metadata associated with the 5 host data items the redundancy metadata MU of the fault tolerant stripe. In view of the above, stripe command splitter 216 can determine that 4 read operations and 6 write operations are invoked during execution of the partial stripe programming operation.

Stripe command splitter 216 can generate one or more MU commands based on the set of memory access operations determined in accordance with previously described embodiments. Each MU command can correspond to a respective memory access operation of the set of memory access operations. For example, stripe command splitter 216 can generate 16 MU commands based on the full stripe programming operation provided by stripe command manager 214. Each of the 16 generated MU commands can correspond to a respective write operation of the determined set of memory access operations, as described above. In some embodiments, stripe command splitter 216 can generate an additional command to generate redundancy metadata based on each of the host data items of the full stripe programming operation. For example, stripe command splitter 216 can generate a command to perform an XOR operation to generate parity data based on each of the host data items of the full stripe programming operation.

In another example, stripe command splitter 216 can generate 10 MU commands based on the partial stripe programming operation provided by stripe command manager 214. Four of the 10 MU commands can correspond to respective read operation of the set of determined memory access operations. Six of the 10 MU commands can correspond to a respective write operation of the set of determined memory access operations. In some embodiments, stripe command splitter 216 can generate an additional command to generate XOR data based on data read from MUs of the fault tolerant stripe and host data items stored at host data cache 256. For example, stripe command splitter 216 can generate a command to perform an XOR operation to generate parity data based on the existing host data programmed to the fault tolerant stripe and the one or more host data items of the partial stripe programming operation.

Stripe command splitter 216 can transmit each of the one or more generated commands (i.e., the MU commands, the redundancy metadata command, etc.) to MU command manager 218. In some embodiments, stripe command splitter 216 (or another module of error recovery component 113, such as stripe command manager 214 or MU command manager 218) can initialize a stripe command data structure 254 for each operation associated with the respective stripe command. Each entry of stripe command data structure 254 can correspond to a respective operation generated by stripe command splitter 216. For example, the entries of stripe command data structure 254 can include a field indicating a respective operation generated by stripe command splitter 216, a field indicating an address associated with a MU of the fault tolerant stripe at which the respective operation is to be performed, an a filed indicating a status of the respective operation. In some embodiments, stripe command splitter 216 can also allocate a set of memory buffers (e.g., of MU command cache 258) to store data read from the fault tolerant stripe, as described herein.

MU command manager 218 can be configured to execute one or more commands received from stripe command manager 214 or stripe command splitter 216. MU command manager 218 can determine that the one or more commands associated with the full stripe programming operation to not correspond to a read operation to obtain data that is already programmed to the fault tolerant stripe. Accordingly, MU command manager 218 can execute the redundancy metadata command to generate the redundancy metadata associated with the host data of the full stripe programming operation. In some embodiments, MU command manager 218 can update an entry of stripe command data structure 254 to indicate that the redundancy metadata command is executed. Responsive to generating the redundancy metadata, MU command manager 218 can execute each of the MU commands to write the host data and the generated redundancy metadata to respective MUs of the fault tolerant stripe. In some embodiments, MU command manager 218 can update one or more entries of stripe command data structure 254 to indicate that each of the MU commands of the full stripe programming operation have been executed.

In response to MU command manager 218 executing each of the MU commands of the full stripe programming operation, command response module 220 can receive an indication (e.g., from a local media controller 119 of a memory device 130, 140 of memory sub-system 110) of whether the host data items and/or the redundancy metadata were successfully programmed to the MUs of the fault tolerant stripe. Command response module 220 can update a status field of one or more entries corresponding to the MU operations based on the received indication, in some embodiments. In additional or alternative embodiments, command response module 220 can transmit a notification including the received indication to MU command manager 218 and/or stripe command manager 214. In response to determining that the host data items and/or the redundancy metadata were successfully programmed to the fault tolerant stripe, MU command manager 218 and/or stripe command manager 214 can generate a notification indicating the successful programming and can transmit the notification to the host system 120. In response to determining that the host data items and/or the redundancy metadata were not successfully programmed to the fault tolerant stripe, MU command manager 218 and/or stripe command manager 214 can initiate one or more error correction operations to correct one or more errors associated with the programming. In additional or alternative embodiments, MU command manager 218 and/or stripe command manager 214 can generated updated stripe commands and/or MU commands to program each of the host data items to another fault tolerant stripe of memory sub-system 110, in accordance with embodiments described above.

As indicated above, the MU commands and redundancy metadata command generated by stripe command splitter 216 can correspond to a partial stripe programming operation. In such embodiments, MU command manager 218 can determine that one or more commands correspond to read operations to obtain data that is already programmed to the fault tolerant stripe (i.e., host data and redundancy metadata for the host data). MU command manager 218 can execute each of the MU commands that correspond to the read operations as a first series of commands. In some embodiments, MU command manager 218 can update one or more entries of stripe command data structure 252 to indicate that each of the first series of commands have been executed.

In some embodiments, ECC module 222 can perform one or more ECC checking operations to determine that the data read from the MUs of the fault tolerant stripe is valid data. Responsive to confirming that the data read from the MUs is valid data, ECC module 222 (or another module of error recovery component 113) can store the data at a MU command cache 258 of memory 250 (e.g., at the allocated buffers of MU command cache 258). Responsive to determining that the data read from the MUs is not valid data (e.g., the ECC check has failed), ECC module 222 can initiate one or more error correction operations to recover the data at the MUs of the fault tolerant stripe.

Command response module 220 can detect that the data read from the MUs (e.g., existing host data, redundancy metadata for the existing host data) is programmed to the MU command cache 258 and can transmit an indication of the detection to MU command manager module 218. In some embodiments, command response module 220 and/or MU command manager 218 can update one or more entries of stripe command data structure 254 to indicate that the data was successfully read from the MUs of the fault tolerant stripe. Responsive to receiving an indication that the data read from the MUs is programmed to the MU command cache 258, MU command manager 218 can execute a redundancy metadata operation to generate redundancy metadata associated with the host data items to be programmed to the fault tolerant stripe. For example, MU command manager 218 can execute an XOR operation to generate parity data based on the existing host data and each of the host data items to be programmed to the fault tolerant stripe. In another example, MU command manager 218 can execute an XOR operation to generate parity data based on the redundancy metadata for the existing host data and each of the host data items to be programmed to the fault tolerant stripe. Responsive to generating the redundancy metadata associated with the host data items, MU command manager 218 can execute each of the MU commands associated with the partial stripe programming operation that correspond to the write operations of the set of determined memory access operations as a second series of commands. As indicated above, each of the second series of commands can correspond to a respective write operation to write a host data item or the generated redundancy metadata to a respective MU of the fault tolerant stripe. In some embodiments, MU command manager 218 can update one or more entries of stripe command data structure 252 to indicate that each of the second series of commands have been executed.

Command response module 220 can receive an indication (e.g., from a local media controller 119 of a memory device 130, 140) indicating whether the host data items and/or the redundancy metadata were successfully programmed to the MUs of the fault tolerant stripe. Command response module 220 can update a status field of one or more entries corresponding to the operations of the second series of commands based on the received indication, in some embodiments. In additional or alternative embodiments, command response module 220 can transmit a notification including the received indication to MU command manager 218 and/or stripe command manager 214. In response to determining that the host data items and/or the redundancy metadata were successfully programmed to the fault tolerant stripe, MU command manager 218 and/or stripe command manager 214 can generate a notification indicating the successful programming and can transmit the notification to the host system 120. In additional or alternative embodiments, MU command manager 218 and/or stripe command manager 214 can release the allocated buffers of MU command cache 258. MU command manager 218 and/or stripe command manager 214 can also remove data associated with the host data items from stripe command data structure 254, in some embodiments. In response to determining that the host data items and/or the redundancy metadata were not successfully programmed to the fault tolerant stripe, MU command manager 218 and/or stripe command manager 214 can initiate one or more error correction operations to correct one or more errors associated with the programming, as described above.

It should be noted that although some embodiments of the present disclosure are directed to executing commands associated with a full stripe programming command or a partial stripe programming commands, embodiments of the present disclosure can be applicable to other stripe-based operations at a memory sub-system. For example, embodiments of the present disclosure can be applicable to a stripe or MU read operation (e.g., an operation to read data programmed to one or more MUs of a fault tolerant stripe), a stripe refresh operation (e.g., an operation to read host data programmed to one or more MUs of a fault tolerant stripe and write the read host data back to the one or more MUs), a stripe move command (e.g., an operation to read host data programmed to one or more MUs of a fault tolerant stripe and write the read host data to MUs of another fault tolerant stripe), and so forth. In additional or alternative examples, embodiments of the present disclosure can be applicable to stripe-based memory management operations, such as stripe error recovery operation (e.g., an operation to read host data and redundancy metadata programmed to MUs of a fault tolerant stripe and recover host data that was subject to a failed memory access operation), a stripe validity operation (e.g., an operation to store an indication of a validity (e.g., poison) status associated with host data at an MU of the fault tolerant stripe), stripe scheduling operation (e.g., an operation to add or remove one or more MU operations from a scheduling pipeline in response to determining that one or more MU operations associated with a fault tolerant stripe have failed), and so forth. In such embodiments, stripe command splitter 216 can determine a set of memory access operations that correspond to the stripe-based operation, in accordance with embodiments described above, and can generate one or more MU commands that correspond to the determined set of memory access operations. Command response module 220 can track a status of each MU command (e.g., via stripe command data structure 234), in accordance with previously described embodiments.

It should also be noted that although some embodiments of the present disclosure are directed to a single stripe command data structure 254, one or more additional data structures can be initialized at memory sub-system 110 to store the data included in stripe command data structure 254 and/or other data associated with each command generated by stripe command splitter 216. For example, one or more additional data structures can be initialized to store one or more command bitmaps associated with a respective stripe-based operation, an identifier associated with a portion of host data cache 256 and/or MU command cache 258 that stores a host data item and/or redundancy metadata (e.g., received from host system 120, read from an MU of a fault tolerant stripe, etc.), and so forth.

Figure 3:
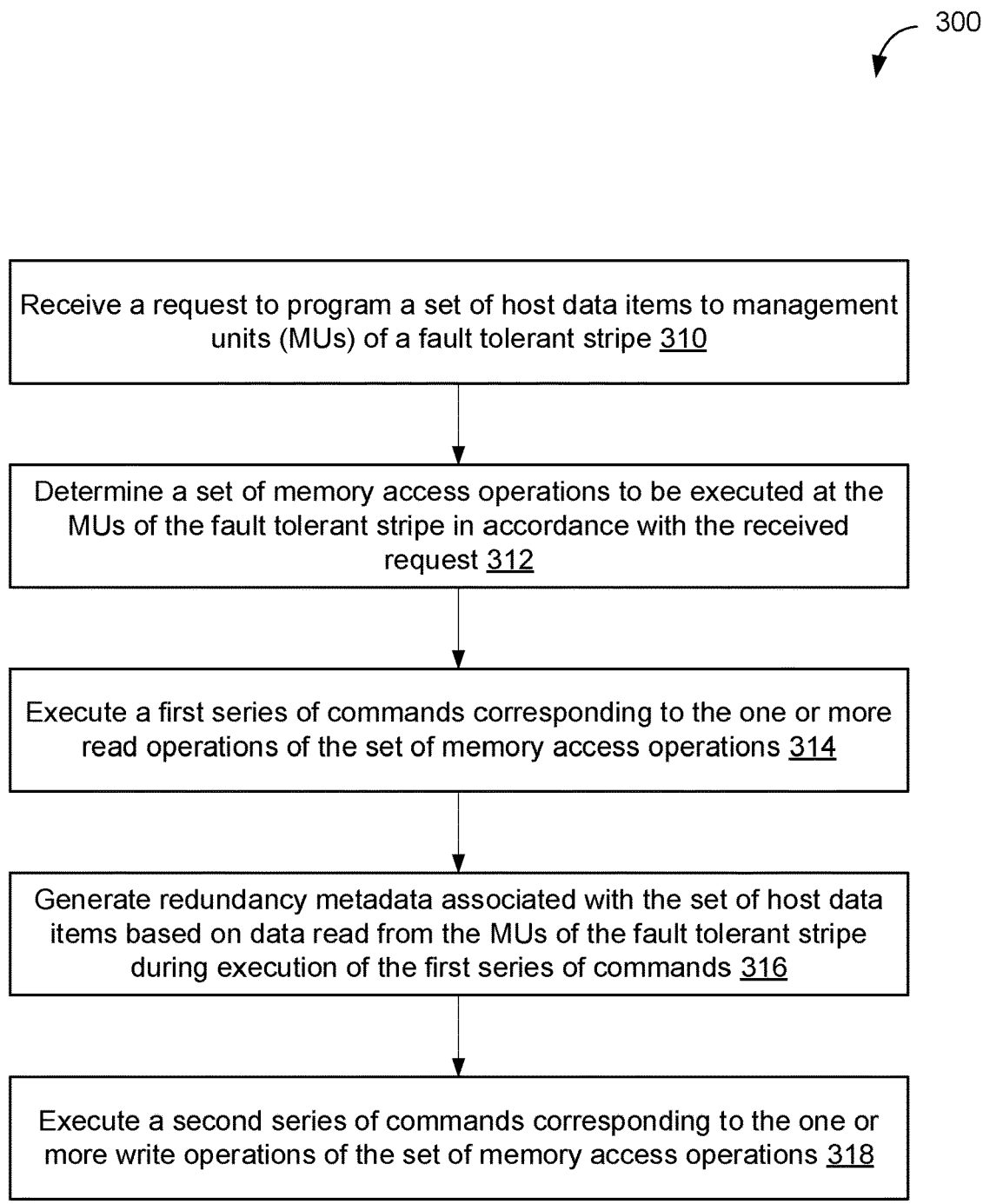
FIG. 3 is a flow diagram of an example method for enabling stripe-based operations for error recovery at a memory sub-system, in accordance with some embodiments of the present disclosure.

FIG. 3 is a flow diagram of an example method 300 for redundancy metadata wear leveling at a memory sub-system, in accordance with embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the error recovery component 113 of FIG. 1. In other or similar embodiments, one or more operations of method 300 is performed by another component of the memory sub-system controller 115, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4A:
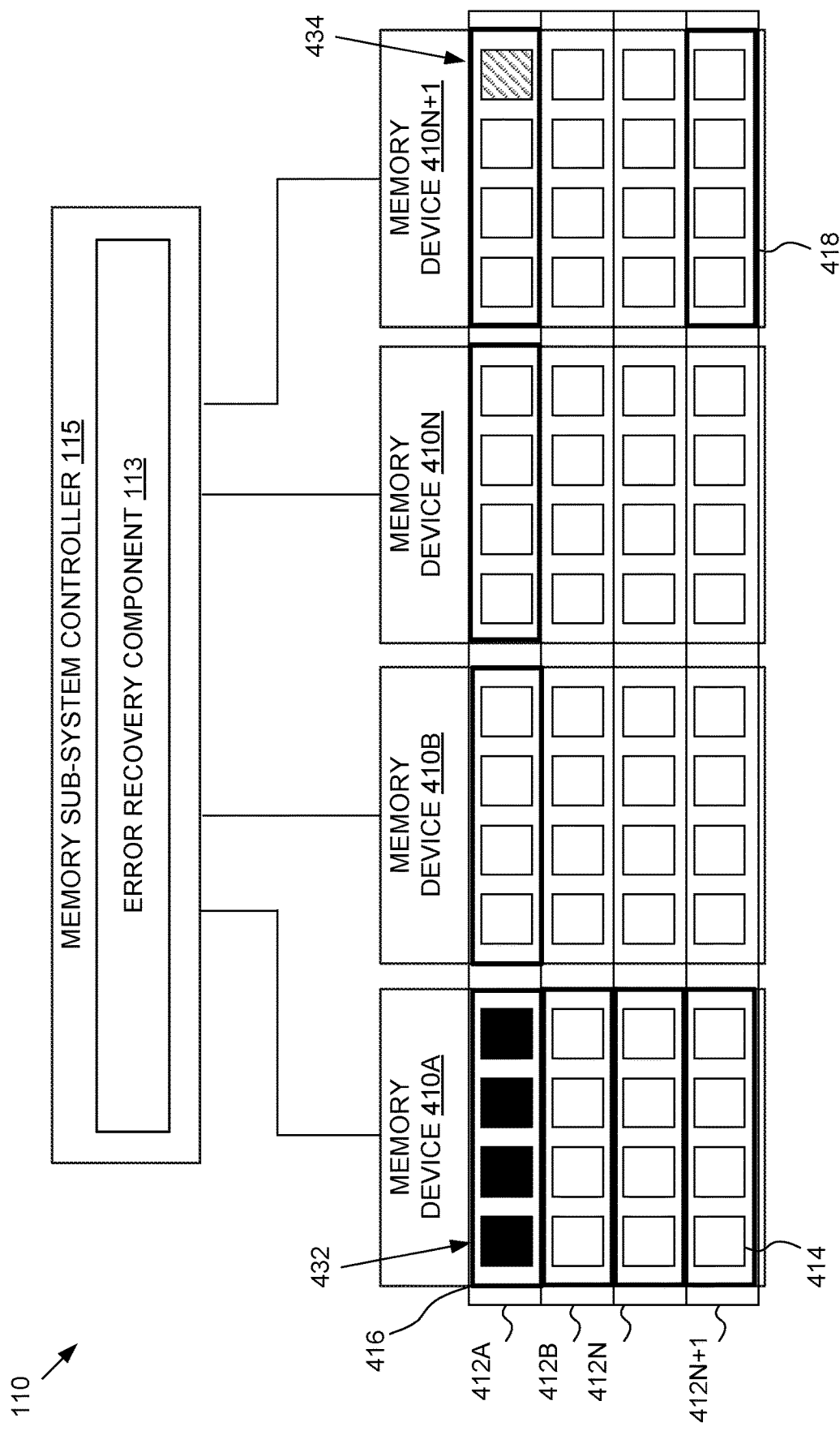
FIGS. 4A-4B depict an example of enabling stripe-based operations for error recovery at a memory sub-system, in accordance with some embodiments of the present disclosure.

At block 310, processing logic can receive a request to program a set of host data items to management units (MUs) of a fault tolerant stripe. In some embodiments, the fault tolerant stripe can be a fault tolerant stripe of a memory sub-system, such as memory sub-system, 110 of FIG. 4A. As illustrated in FIG. 4A, multiple memory devices 410 can be connected to memory sub-system controller 115 of memory sub-system 110. One or more fault tolerant stripes 412 can be included across the multiple memory devices 410. As indicated above, a fault tolerant stripe refers to a collection of management units (MUs) (e.g., planes, blocks, pages, etc.) at particular portions of two or more memory devices 410 that store host data that is recoverable by memory sub-system controller 115. In some embodiments, each memory device 410 illustrated in FIG. 4A (e.g., memory device 410A, 410B, 410N, 410N+1) can correspond to a memory device 130, 140 described with respect to FIG. 1.

It should be noted that although FIG. 4A depicts four memory devices 410 connected to memory sub-system controller 115, embodiments of the present disclosure can be directed to any number of memory devices. It should also be noted that although embodiments of the present disclosure may be directed to a fault tolerant stripe 412 across multiple memory devices 410 connected to memory sub-system controller 115, embodiments of the present disclosure can be directed to a fault tolerant stripe 412 across multiple portions of a single memory device 410.

Each memory device 410 can include one or more MUs 414 (e.g., blocks, pages, etc.). A plane 416 at a respective memory device 410 can refer to a grouping of one or more MUs 414 residing at a particular region of memory device 410. In some embodiments, a memory device 410 can include at least two planes 416. For example, as illustrated in FIG. 4A, each memory device 410 connected to memory sub-system controller can include four planes 416 that each include a grouping of one or more MUs 414. It should be noted that although some embodiments of the disclosure are directed to memory devices 410 that include four planes 416, embodiments of the present disclosure can apply to memory devices that include any number of planes 416.

As indicated above, processing logic (e.g., error recovery component 113) can receive a request to program a set of host data items to a fault tolerant stripe 412 of memory sub-system 110. For illustrative purposes only, some embodiments of the present description can be directed to a request to program host data items to fault tolerant stripe 412A. However, embodiments of the present description can be directed to any fault tolerant stripes 412 of memory sub-system 110. As illustrated in FIG. 4A, fault tolerant stripe 412A can include 16 total MUs. Fifteen of the 16 total MUs can be host data MUs and one MU can be a redundancy metadata MU, as described above. In an illustrative example, host data can be programmed to four of the 15 host data MUs (i.e., at MUs 432) when the request to program the set of host data items is received. MU 434 can store redundancy metadata associated with the host data programmed to MUs 432. Accordingly, 11 host data MUs can be available to store incoming host data (i.e., including the set of host data items of the request).

Referring back to FIG. 3, at block 312, processing logic can determine a set of memory access operations to be executed at the MUs of the fault tolerant stripe in accordance with the received request. In some embodiments, stripe command manager 214 of FIG. 2 can generate a stripe-based command (e.g., a read-modify-write command) associated with the set of host data items (e.g., for a partial stripe programming operation) as described above. Stripe command splitter 216 can determine the set of memory access operations, in accordance with previously described embodiments. In accordance with the previously provided illustrative example, stripe command splitter 216 can determine that five read operations are to be performed to read the host data from MUs 432 and redundancy metadata from MU 434. Stripe command splitter 216 can also determine that the set of host data items is to be programmed to four MUs (e.g., the set of host data items includes four data items), and five write operations are to be performed to program the set of host data items to the four MUs and redundancy metadata associated with the four MUs to MU 434.

At block 314, processing logic can execute a first series of commands corresponding to one or more read operations of the set of memory access operations. As indicated above, stripe command splitter 216 can generate the first series of commands based on the one or more read operations of the set of memory access operations determined at block 312. Accordingly, each of the first series of commands can correspond to reading host data from one of MUs 432 and/or reading redundancy metadata for the read host data from MU 434. In response to executing the first series of commands, processing logic can obtain the read host data and/or the read redundancy metadata from MU command cache 258, as described above.

At block 316, processing logic can generate redundancy metadata associated with the set of host data items based on data read from the MUs of the fault tolerant stripe during execution of the first series of commands. As indicated above, processing logic can generate redundancy metadata associated with the set of host data items by executing an XOR operation to generate parity data based on each of the set of host data items and the host data items read from MUs 432, in some embodiments. In other or similar embodiments, processing logic can generate redundancy metadata associated with the set of host data items by executing an XOR operation to generate parity data based each of the set of host data items and the redundancy metadata read from MU 434.

Figure 4B:
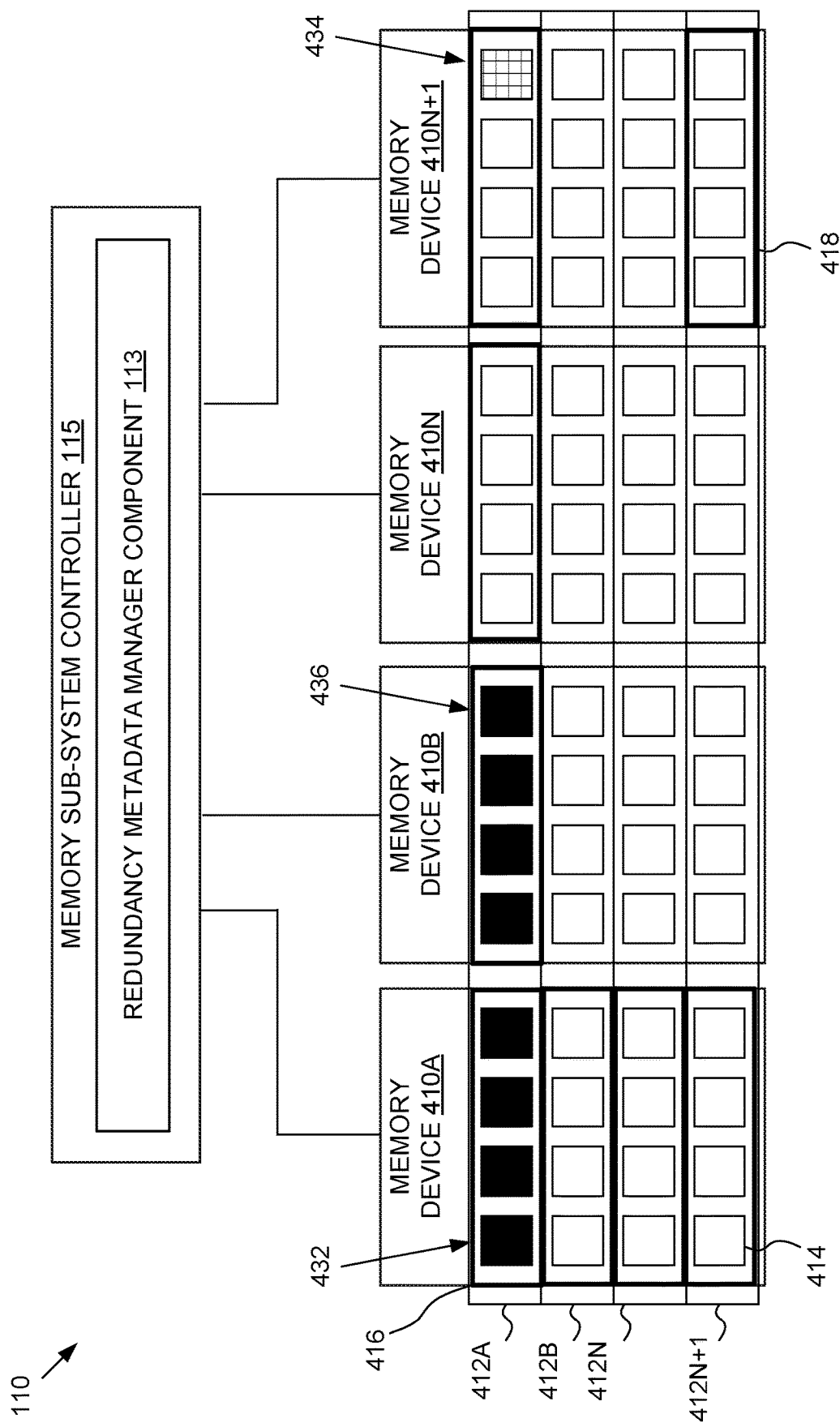

At block 318, processing logic can execute a second series of commands corresponding to the one or more write operations of the set of memory access operations. Stripe command splitter 216 can generate the second series of commands based on the one or more write operations of the set of memory access operations determined at block 312. Accordingly, each of the second series of commands can correspond to writing each of the set of host data items to a respective MU of fault tolerant stripe 412A or writing redundancy metadata generated at block 316 to MU 434. As illustrated in FIG. 4B, processing logic can execute the second series of commands to program each of the set of host data items to MUs 436. Processing logic can also execute the series of commands to program redundancy metadata generated at block 316 (i.e., updated redundancy metadata) to MU 434.

Figure 5:
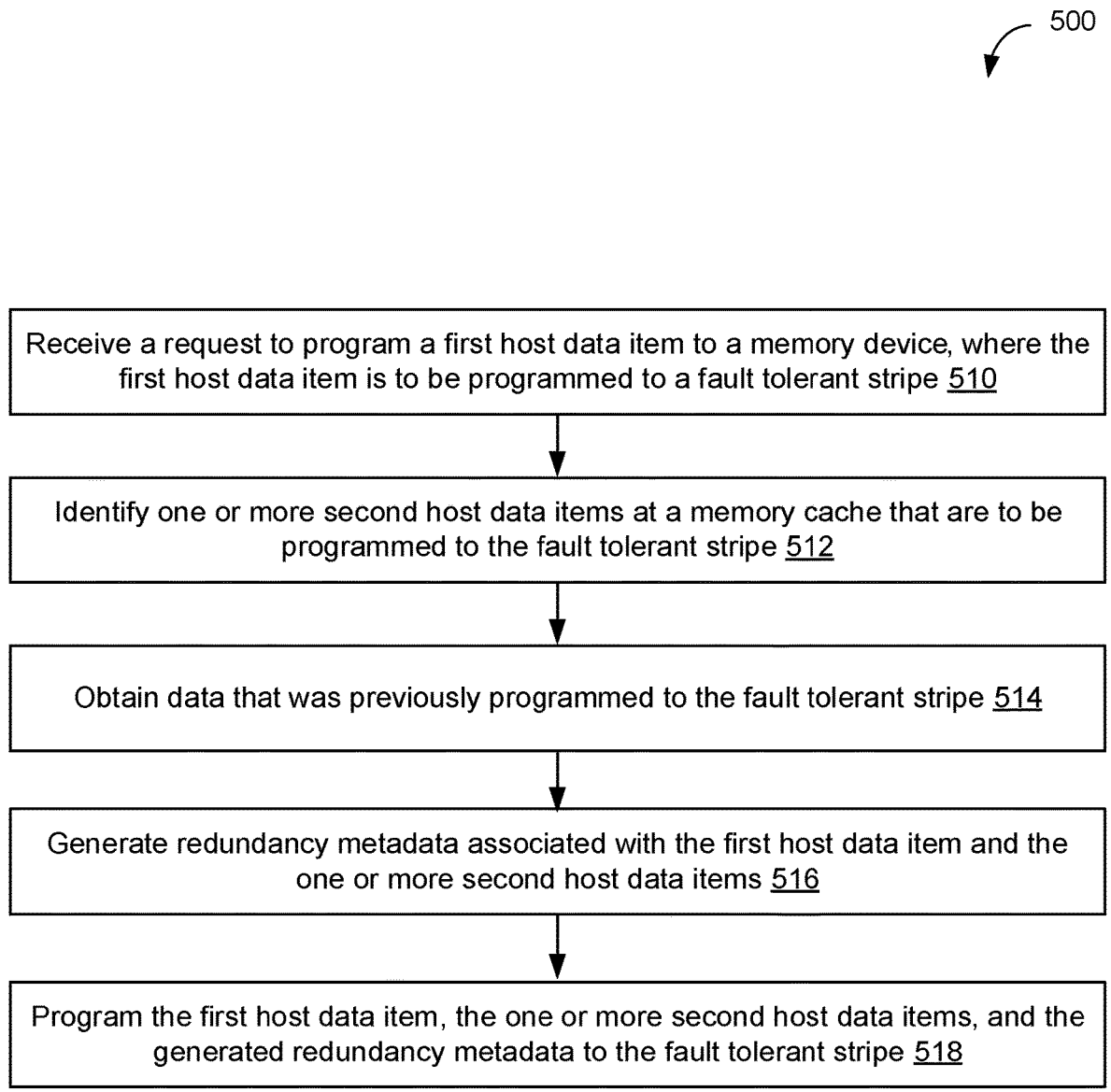
FIG. 5 is a flow diagram of another example method for enabling stripe-based operations for error recovery at a memory sub-system, in accordance with some embodiments of the present disclosure.

FIG. 5 is a flow diagram of another example method 500 for redundancy metadata wear leveling at a memory sub-system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the error recovery component 113 of FIG. 1. In other or similar embodiments, one or more operations of method 500 is performed by another component of the memory sub-system controller, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 510, processing logic receives a request (e.g., from host system 120) to program a first host data item to a memory device. Processing logic can determine that the first host data item is to be programmed to a fault tolerant stripe of the memory device based on a logical address associated with the first host data item, as described above. At block 512, processing logic can identify one or more second host data items at a memory cache (e.g., host data cache 256) that are to be programmed to the fault tolerant stripe. Processing logic can determine that the one or more second host data items are to be programmed to the fault tolerant stripe based on a logical address associated with each of the one or more second host data items. At block 514, processing logic can obtain data that was previously programmed to the fault tolerant stripe. As described above, processing logic can obtain the data by determining a set of memory access operations associated with a stripe-based operation to program the host data items to the fault tolerant stripe and generating a first series of commands based on one or more read operations of the set of memory access operations. The obtained data can correspond to the existing host data programmed to the fault tolerant stripe and/or redundancy metadata associated with the existing host data, in some embodiments.

At block 516, processing logic can generate redundancy metadata associated with the first host item and the one or more second host data items. For example, processing logic can execute a redundancy metadata generation operation (e.g., an XOR operation) based on the first host item and the one or more second host data items and the data obtained from the fault tolerant stripe, as described above. At block 518, processing logic can program the first host data item, the one or more second host data items, and the generated redundancy metadata to the fault tolerant stripe, in accordance with embodiments provided herein.

Figure 6:
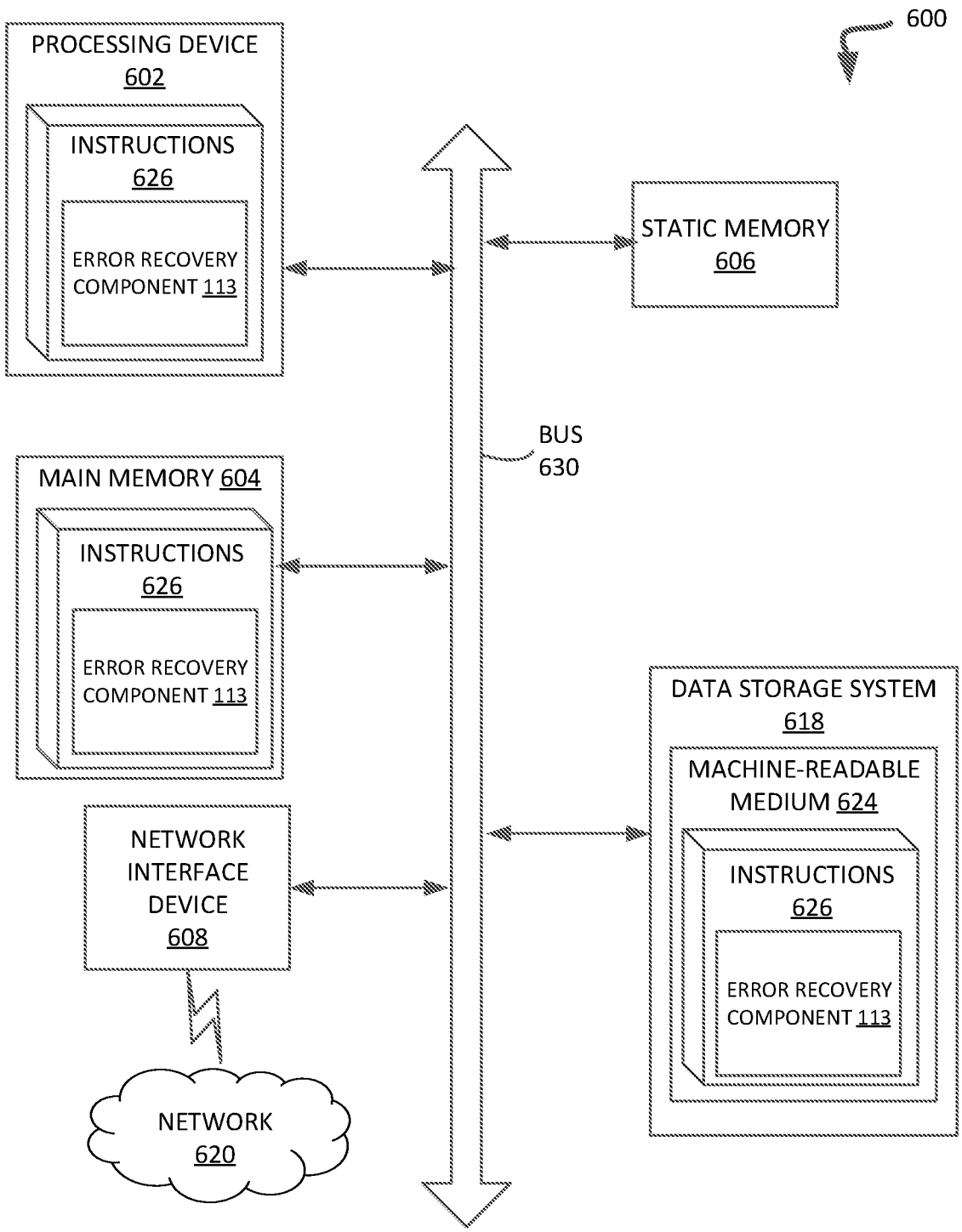
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error recovery component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a voltage bin boundary component (e.g., the error recovery component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving a request comprising a stripe-based command to access a set of host data items at management units (MUs) of a fault tolerant stripe associated with a memory sub-system configured to support non-stripe based commands;
   determining a set of memory access operations to be executed at the MUs of the fault tolerant stripe based on the stripe-based command of the received request, wherein the set of memory access operations comprise one or more read operations to read data from the MUs of the fault tolerant stripe and one or more write operations to write the set of host data items and redundancy metadata associated with the set of host data items to the MUs of the fault tolerant stripe;
   executing a first series of commands corresponding to the one or more read operations of the set of memory access operations;
   generating the redundancy metadata associated with the set of host data items based on the data read from the MUs of the fault tolerant stripe during execution of the first series of commands and the set of host data items; and
   executing a second series of commands corresponding to the one or more write operations of the set of memory access operations.

2. The method of claim 1, wherein determining the set of memory access operations to be executed at the MUs of the fault tolerant stripe comprises:
   determining one or more additional host data items that are already programmed to the MUs of the fault tolerant stripe, wherein each of the one or more read operations correspond to at least one of reading an additional host data item of the one or more additional host data items from a respective MU of the fault tolerant stripe or reading additional redundancy metadata associated with the one or more additional host data items from the respective MU of the fault tolerant stripe.

3. The method claim 1, wherein each of the one or more write operations correspond to at least one of writing a host data item of the set of host data items to a respective MU of the fault tolerant stripe or writing the generated redundancy metadata to a respective MU of the fault tolerant stripe.

4. The method of claim 1, wherein the data read from the MUs of the fault tolerant stripe during execution of the first series of commands comprises one or more additional host data items that are already programmed to the fault tolerant stripe, and wherein generating the redundancy metadata comprises:
   executing an exclusive-or (XOR) operation based on the one or more additional host data items and each of the set of host data items.

5. The method of claim 1, wherein the data read from the MUs of the fault tolerant stripe during execution of the first series of commands comprises additional redundancy metadata associated with additional host data items that are already programmed to the fault tolerant stripe, and wherein generating the redundancy metadata comprises:
   executing an exclusive-or (XOR) operation based on the additional redundancy metadata and each of the set of host data items.

6. The method of claim 1, wherein the redundancy metadata is generated responsive to detecting that the first series of commands were successfully executed.

7. The method of claim 1, further comprising:
   responsive to receiving the request comprising the stripe-based command to access the set of host data items at the MUs of the fault tolerant stripe, allocating a set of memory buffers associated with the memory sub-system to store the data read from the MUs of the fault tolerant stripe.

8. The method of claim 7, responsive to detecting that the second series of commands were successfully executed, releasing the allocated set of memory buffers.

9. The method of claim 1, wherein the stripe-based command comprises a read-modify-write command.

10. A memory sub-system comprising:
    a memory device comprising a plurality of fault tolerant stripes; and
    a processing device coupled to the memory device, the processing device to perform operations comprising:

receiving a request comprising a stripe-based command to program a first host data item to the memory device, wherein the first host data item is to be programmed to management units (MUs) of a fault tolerant stripe of the plurality of fault tolerant stripes, and wherein the memory sub-system is configured to support non-stripe based commands;

identifying one or more second host data items at a memory cache associated with the memory device that are to be programmed to the MUs of the fault tolerant stripe;

obtaining data that was previously programmed to the MUs of the fault tolerant stripe;

generating redundancy metadata associated with the first host data item and the one or more second host data items based on the obtained data, the first host data item, and the one or more second host data items; and programming the first host data item, the one or more second host data items, and the generated redundancy metadata to the MUs of the fault tolerant stripe.

11. The memory sub-system of claim 10, wherein identifying the one or more second host data items at the memory cache comprises:
determining that a logical address associated with each of the second host data items at the memory cache corresponds to the fault tolerant stripe.

12. The memory sub-system of claim 10, wherein the data that was previously programmed to the MUs of the fault tolerant stripe corresponds to at least one of one or more third host data items or redundancy metadata generated for the one or more third host data item.

13. The memory sub-system of claim 12, wherein obtaining the data that was previously programmed to the MUs of the fault tolerant stripe comprises:
determining, based on one or more entries of a logical-to-physical (L2P) data structure associated with the memory device, a physical address associated with the at least one of the one or more third host data items or the redundancy metadata generated for the one or more third host data items; and
executing a series of one or more operations to access the at least one of the one or more third host data items or the redundancy metadata generated for the one or more third host data items.

14. The memory sub-system of claim 10, wherein generating the redundancy metadata comprises performing an exclusive-OR (XOR) operation based on the obtained data, the first host data item, and the one or more second host data items.

15. The memory sub-system of claim 10, wherein the operations further comprise:
responsive to detecting that the first host data item, the one or more second host data items, and the generated redundancy metadata are successfully programmed to the MUs of the fault tolerant stripe, transmitting a signal indicating the successful programming in response to the received request.

16. A non-transitory computer-readable storage medium comprising instructions that, when executed by a processing device, cause the processing device to perform operations comprising:
receiving a request comprising a stripe-based command to program a set of host data items to management units (MUs) of a fault tolerant stripe associated with a memory sub-system configured to support non-stripe based commands;

determining a set of memory access operations to be executed at the MUs of the fault tolerant stripe based on the stripe-based command of the received request, wherein the set of memory access operations comprise one or more read operations to read data from the MUs of the fault tolerant stripe and one or more write operations to write the set of host data items and redundancy metadata associated with the set of host data items to the MUs of the fault tolerant stripe;

executing a first series of commands corresponding to the one or more read operations of the set of memory access operations;

generating the redundancy metadata associated with the set of host data items based on the data read from the MUs of the fault tolerant stripe during execution of the first series of commands and the set of host data items; and executing a second series of commands corresponding to the one or more write operations of the set of memory access operations.

17. The non-transitory computer-readable storage medium of claim 16, wherein determining the set of memory access operations to be executed at the MUs of the fault tolerant stripe comprises:
determining one or more additional host data items that are already programmed to the MUs of the fault tolerant stripe, wherein each of the one or more read operations correspond to at least one of reading an additional host data item of the one or more additional host data items from a respective MU of the fault tolerant stripe or reading additional redundancy metadata associated with the one or more additional host data items from the respective MU of the fault tolerant stripe.

18. The non-transitory computer-readable storage medium of claim 16, wherein each of the one or more write operations correspond to at least one of writing a host data item of the set of host data items to a respective MU of the fault tolerant stripe or writing the generated redundancy metadata to a respective MU of the fault tolerant stripe.

19. The non-transitory computer-readable storage medium of claim 16, wherein the data read from the MUs of the fault tolerant stripe during execution of the first series of commands comprises one or more additional host data items that are already programmed to the fault tolerant stripe, and wherein generating the redundancy metadata comprises:
executing an exclusive-or (XOR) operation based on the one or more additional host data items and each of the set of host data items.

20. The non-transitory computer-readable storage medium of claim 16, wherein the data read from the MUs of the fault tolerant stripe during execution of the first series of commands comprises additional redundancy metadata associated with additional host data items that are already programmed to the fault tolerant stripe, and wherein generating the redundancy metadata comprises:
executing an exclusive-or (XOR) operation based on the additional redundancy metadata and each of the set of host data items.

\* \* \* \* \*